## (12) United States Patent
Nakagawa et al.

(10) Patent No.: US 10,261,350 B2
(45) Date of Patent: Apr. 16, 2019

(54) OPTICAL TRANSMITTING APPARATUS AND OPTICAL LEVEL CONTROL METHOD

(71) Applicant: FUJITSU LIMITED, Kawasaki-shi, Kanagawa (JP)

(72) Inventors: Goji Nakagawa, Sagamihara (JP); Yoshio Hirose, Hachioji (JP); Kyosuke Sone, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 11 days.

(21) Appl. No.: 15/804,643

(22) Filed: Nov. 6, 2017

(65) Prior Publication Data

US 2018/0180909 A1    Jun. 28, 2018

(30) Foreign Application Priority Data

Dec. 28, 2016 (JP) ................... 2016-254617

(51) Int. Cl.
*G02B 6/26* (2006.01)
*G02B 6/42* (2006.01)
*G02F 1/09* (2006.01)

(52) U.S. Cl.
CPC ............. *G02F 1/091* (2013.01); *G02B 6/266* (2013.01); *G02B 6/4246* (2013.01); *G02F 2203/48* (2013.01)

(58) Field of Classification Search
CPC ........ G02B 6/266; G02B 6/32; G02B 6/4246; G02F 1/091; G02F 1/092; G02F 1/093; G02F 2203/48

USPC ..... 385/88–94, 140; 398/140, 141; 359/280; 324/244.1

See application file for complete search history.

(56) References Cited

U.S. PATENT DOCUMENTS 5,867,300 A * 2/1999 Onaka ................. G02F 1/09
324/244.1

OTHER PUBLICATIONS

S. Pachnicke et al., "Field Demonstration of a Tunable WDM-PON System with Novel SFP+ Modules and Centralized Wavelength Control," OFC 2015 M2A.6, 2015, 3 pp.

* cited by examiner

*Primary Examiner* — Michael P Mooney
(74) *Attorney, Agent, or Firm* — Staas & Halsey LLP

(57) ABSTRACT

An optical transmitting apparatus includes a variable optical attenuator of a magneto-optical effect type disposed by spatial coupling between a light source and an optical fiber, the variable optical attenuator configured to attenuate light output from the light source and coupled to the optical fiber, according to an input driving voltage; a generator configured to generate the driving voltage of the variable optical attenuator based on information to be superimposed on the light by the variable optical attenuator, the generator inputting the generated driving voltage into the variable optical attenuator; and a controller configured to control a bias of the driving voltage generated by the generator, the controller controlling an amplitude of the driving voltage generated by the generator, based on data according to characteristics between the driving voltage and an attenuation amount of the light by the variable optical attenuator.

15 Claims, 10 Drawing Sheets

FIG.5

| Bias Voltage [V] | Average Attenuation Amount [dB] | Voltage Amplitude [mV] and Superimposition Modulation Degree [%] | | | | | |
|---|---|---|---|---|---|---|---|
| | | ±100 [mV] | ±200 [mV] | ... | ±500 [mV] | ±600 [mV] | |
| 0.0 [V] | 1.0 [dB] | | | | | | |
| ... | ... | ... | ... | ... | ... | ... | |
| 2.0 [V] | 7.7 [dB] | 1 [%] | 2 [%] | ... | 10 [%] | | |
| ... | ... | ... | ... | ... | ... | ... | |

500

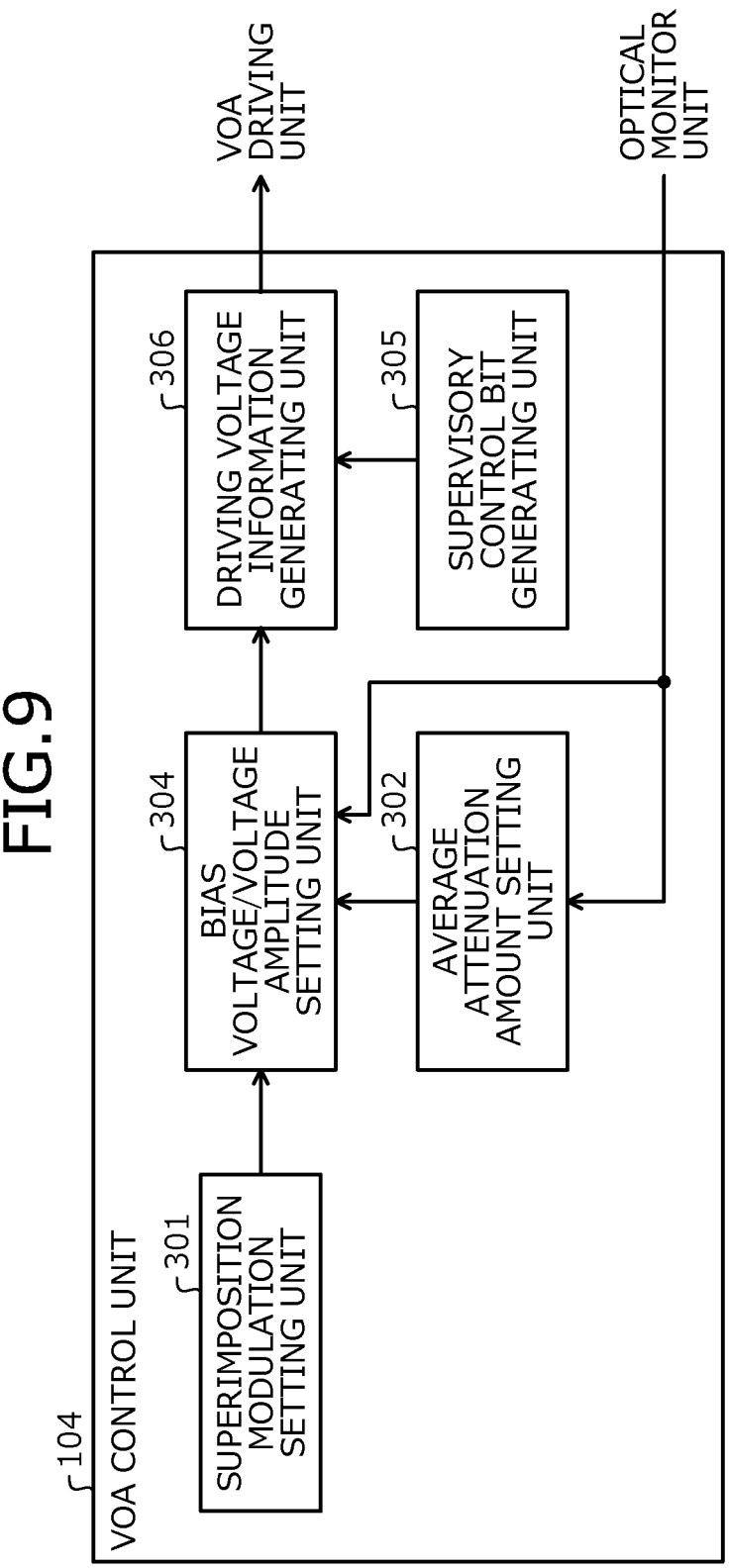

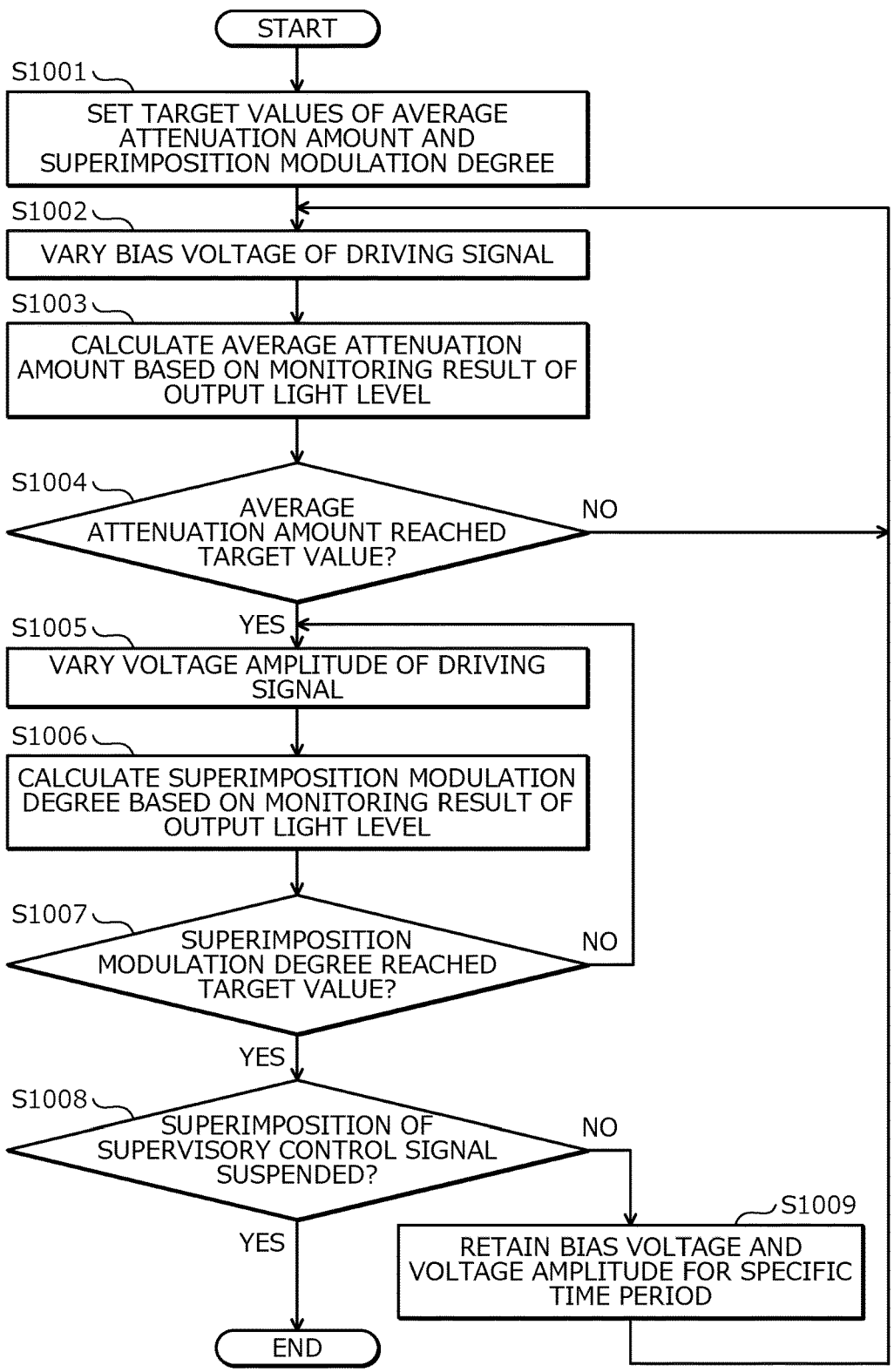

OPTICAL TRANSMITTING APPARATUS AND OPTICAL LEVEL CONTROL METHOD

CROSS REFERENCE TO RELATED APPLICATIONS

This application is based upon and claims the benefit of priority of the prior Japanese Patent Application No. 2016-254617, filed on Dec. 28, 2016, the entire contents of which are incorporated herein by reference.

FIELD

The embodiments discussed herein relate to an optical transmitting apparatus and an optical level control method.

BACKGROUND

Techniques such as, for example, PON and WDM are conventionally used in optical communication. "PON" is an abbreviation for Passive Optical Network. "WDM" is an abbreviation for Wavelength Division Multiplexing. According to a known configuration, a center controls the respective light wavelengths of optical transmitting apparatuses (see, e.g., Stephan Pachnicke, Stephen Mayne, Benoit Quemeneur, Daniel Sayles, Hendrik Schwuchow, Jiannan Zhu, Adrian Wonfor, Philipp Marx, Mirko Lawin, Markus Fellhofer, Richard Turner, Philipp Neuber, Marco Dietrich, Mike Wale, Richard V. Penty, Ian White, and Joerg-Peter Elbers, "Field Demonstration of a Tunable WDM-PON System with Novel SFP+ Modules and Centralized Wavelength Control", OFC 2015 M2A.6, March 2015). A VOA is known that controls the level of light output and the like by attenuating the light using a variable attenuation amount. "VOA" is an abbreviation for Variable Optical Attenuator.

SUMMARY

According to an aspect of an embodiment, an optical transmitting apparatus includes a variable optical attenuator of a magneto-optical effect type disposed by spatial coupling between a light source and an optical fiber, the variable optical attenuator configured to attenuate light output from the light source and coupled to the optical fiber, according to an input driving voltage; a generator configured to generate the driving voltage of the variable optical attenuator based on information to be superimposed on the light by the variable optical attenuator, the generator inputting the generated driving voltage into the variable optical attenuator; and a controller configured to control a bias of the driving voltage generated by the generator, the controller controlling an amplitude of the driving voltage generated by the generator, based on data according to characteristics between the driving voltage and an attenuation amount of the light by the variable optical attenuator.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram of an example of a LUT according to the first embodiment;

FIG. 9 is a diagram of an example of a VOA control unit according to a second embodiment; and FIG. 10 is a flowchart of an example of an optical level control process executed by the VOA control unit according to the second embodiment.

DESCRIPTION OF THE INVENTION

With conventional techniques, a problem arises in that control of the level of an optical signal output by an optical transmitter and the superimposing of information on the optical signal output by the optical transmitter cannot be realized by a single variable optical attenuator.

Embodiments of an optical transmitting apparatus and an optical level control method according to the present invention will be described in detail with reference to the accompanying drawings.

Figure 1:
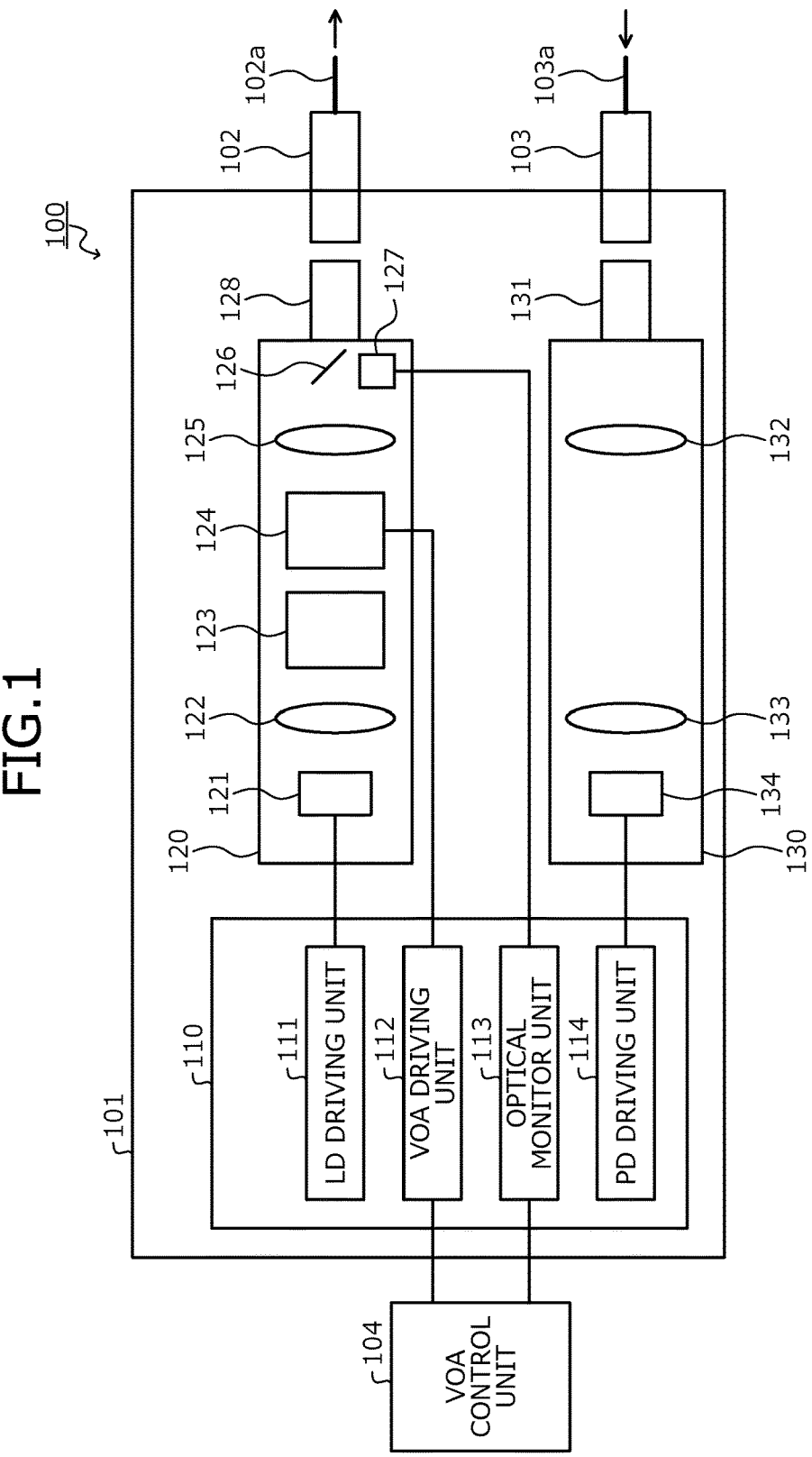
FIG. 1 is a diagram of an example of an optical transmitting apparatus according to a first embodiment.

FIG. 1 is a diagram of an example of an optical transmitting apparatus according to a first embodiment. As depicted in FIG. 1, an optical transmitting apparatus 100 according to the first embodiment includes a transceiver 101 and a VOA control unit 104. Herein, the transceiver 101 is an SFP transceiver as an example, however, the transceiver 100 may be a transceiver of a type different from the SFP transceiver. "SFP" is an abbreviation for Small Form-factor Pluggable.

The transceiver 101 is connected to connecters 102 and 103. The connector 102 is a connector for an optical transmission path such as an optical fiber 102a that transmits an optical signal output from the transceiver 101. The connector 103 is a connector for an optical transmission path such as an optical fiber 103a that transmits an optical signal output from a counterpart apparatus of the transceiver 101. Herein, the connectors 102 and 103 are each an SFP LC connector as an example.

The transceiver 101 superimposes a supervisory control signal on an optical signal generated by an LD element 121 of a TOSA 120, and outputs the optical signal having the supervisory control signal superimposed thereon from the connector 102 to the optical fiber 102a. The supervisory control signal is an arbitrary signal. Herein, as an example, the supervisory control signal is a supervisory control signal to report the state of the optical transmitting apparatus 100 to a center executing management of the optical transmitting apparatus 100, etc. The supervisory control signal may be a control signal that indicates an instruction from the optical transmitting apparatus 100 to another optical transmitting apparatus that is controlled by the optical transmitting apparatus 100, etc.

The transceiver 101 includes a driving circuit 110, the TOSA 120, and a ROSA 130. "TOSA" is an abbreviation for Transmitter Optical SubAssembly. "ROSA" is an abbreviation for Receiver Optical SubAssembly.

The driving circuit 110 is a circuit that drives the TOSA 120 and the ROSA 130. For example, the driving circuit 110 may be realized by a digital circuit such as an FPGA. "FPGA" is an abbreviation for Field Programmable Gate Array. For example, the driving circuit 110 includes an LD driving unit 111, a VOA driving unit 112, and a PD driving unit 114. The driving circuit 110 may also include an optical monitor unit 113. "LD" is an abbreviation for Laser Diode. "PD" is an abbreviation for Photo Detector.

The LD driving unit 111 drives the LD element 121 of the TOSA 120. For example, the LD driving unit 111 generates a driving signal for the LD element 121 based on data to be transmitted as a main signal by the TOSA 120. The LD driving unit 111 outputs the generated driving signal to the LD element 121. For example, a DAC is provided between the LD driving unit 111 and the LD element 121, and the driving signal output by the LD driving unit 111 is converted from a digital signal into an analog signal by the DAC and is applied to the LD element 121. "DAC" is an abbreviation for Digital/Analog Converter.

The VOA driving unit 112 drives a magneto-optical effect-type VOA 124 of the TOSA 120 according to the control from the VOA control unit 104. For example, the VOA driving unit 112 generates a driving signal according to driving voltage information output from the VOA control unit 104. The VOA driving unit 112 applies the generated driving signal (a driving voltage) to the magneto-optical effect-type VOA 124. For example, a DAC is provided between the VOA driving unit 112 and the magneto-optical effect-type VOA 124, and the control signal output by the VOA driving unit 112 is converted from a digital signal into an analog signal by the DAC and is applied to the magneto-optical effect-type VOA 124.

An optical monitor unit 113 monitors the output light level of the TOSA 120 based on a signal output from an optical monitor PD 127 of the TOSA 120. For example, an ADC is provided between the optical monitor PD 127 and the optical monitor unit 113; and a signal output from the optical monitor PD 127 is converted from an analog signal into a digital signal by the ADC and is monitored by the optical monitor unit 113. "ADC" is an abbreviation for Analog/Digital Converter. The optical monitor unit 113 may output to the VOA control unit 104, a monitoring result of the signal output from the optical monitor PD 127.

The PD driving unit 114 drives a PD element 134 of the ROSA 130 and receives a signal output from a PD element 134. For example, an ADC is provided between the PD driving unit 114 and the PD element 134; and the signal output from the PD element 134 is converted from an analog signal into a digital signal and is received by the PD driving unit 114.

The TOSA 120 is an optical transmitter that generates and outputs an optical signal. For example, the TOSA 120 includes the LD element 121, a lens 122, an optical isolator 123, the magneto-optical effect-type VOA 124, a lens 125, a branching unit 126, the optical monitor PD 127, and a connector 128.

The LD element 121 oscillates an optical signal according to a driving signal output from the LD driving unit 111, and outputs the oscillated optical signal to the lens 122 as a main signal. The modulation method for the optical signal oscillated by the LD element 121 may be any one of various types of modulation methods such as amplitude modulation, phase modulation, and frequency modulation.

The lens 122 collimates the optical signal output from the LD element 121, and outputs the collimated optical signal to the optical isolator 123. The optical isolator 123 outputs to the magneto-optical effect-type VOA 124, the optical signal output from the lens 122. The optical isolator 123 blocks light from the magneto-optical effect-type VOA 124 side of the TOSA 120 from entering the lens 122 side of the TOSA 120.

The magneto-optical effect-type VOA 124 attenuates the optical signal output from the optical isolator 123 according to the driving signal output from the VOA driving unit 112. For example, the magneto-optical effect-type VOA 124 outputs the optical signal output from the optical isolator 123 toward the connector 128, and finely varies the output direction of the optical signal according to the driving signal output from the VOA driving unit 112. As a result, the coupling rate of the optical signal in the optical fiber 102a is varied and the attenuation amount of the optical signal may be varied according to the driving signal.

Thus, the power of the optical signal entering the optical fiber 102a (the output light level) may be controlled. The driving signal is varied according to the supervisory control signal thereby enabling the optical signal to be modulated by the attenuation executed by the magneto-optical effect-type VOA 124, and the supervisory control signal to be superimposed on the optical signal. The modulation of the supervisory control signal is executed, for example, at a frequency lower than that of the modulation of the main signal. Herein, as an example, the modulation by the superimposition is amplitude modulation executed by varying the attenuation amount of the magneto-optical effect-type VOA 124, however, the modulation is not limited to this. For example, the modulation by the superimposition may be phase modulation executed by varying the attenuation amount of the magneto-optical effect-type VOA 124, frequency modulation, or the like.

The magneto-optical effect-type VOA 124 is a VOA of the magneto-optical effect type (a spatial coupling type) and therefore, is small and may be arranged easily between the lenses 122 and 125. The configuration of the magneto-optical effect-type VOA 124 will be described later (see, for example, FIG. 2).

The lens 125 condenses the optical signal output from the magneto-optical effect-type VOA 124 onto an end portion to the optical fiber 102a through the connector 128 and the connector 102. For example, the lenses 122 and 125 are confocal lenses whose focal positions are same as each other. The branching unit 126 intensity-branches a portion of the optical signal output from the lens 125 and outputs the intensity-branched optical signal to the optical monitor PD 127.

The optical monitor PD 127 receives the optical signal output from the branching unit 126 and outputs to the optical monitor unit 113, a signal (an electric signal) corresponding to the power of the received optical signal. When the magneto-optical effect-type VOA 124 finely varies the output direction of the optical signal, the coupling rate of the optical signal in the optical monitor PD 127 is also varied together with the coupling rate of the optical signal in the optical fiber 102a. The signal indicating the power of the optical signal (the output light level) entering the optical fiber 102a may be output by the optical monitor PD 127 to the optical monitor unit 113.

The connector 128 is a connector that enables the connector 102 to be connected to the TOSA 120, causes the optical signal output from the lens 125 to pass therethrough, and outputs the optical signal to the connector 102. The optical signal output from the connector 128 to the connector 102 is coupled to an end portion of the optical fiber 102a and is transmitted by the optical fiber 102a to the counterpart apparatus of the transceiver 101. The connector 128 is a connector corresponding to the shape of the connector 102 and herein, as an example, is an SFP LC connector.

The ROSA 130 is an optical receiver that receives an optical signal entering thereinto. For example, the ROSA 130 includes a connector 131, lenses 132 and 133, and a PD element 134. An optical signal transmitted by the optical fiber 103a from the counterpart apparatus of the transceiver 101 to the transceiver 101 enters the connector 131 through the connector 103 that is connected to the transceiver 101.

The connector 131 is a connector that enables the connector 103 to be connected to the ROSA 130, and causes the optical signal output from the connector 103 to pass therethrough, and outputs the optical signal to the lens 132. The connector 131 is a connector corresponding to the shape of the connector 103 and herein, as an example, is an SFP LC connector.

The lens 132 collimates the optical signal output from the connector 131, and outputs the collimated optical signal to the lens 133. The lens 133 condenses the optical signal output from the lens 132 onto the PD element 134. For example, the lenses 132 and 133 are confocal lenses whose focal positions are same as each other. The PD element 134 receives the optical signal condensed by the lens 133. The PD element 134 outputs to the PD driving unit 114, a signal (an electric signal) corresponding to the power of the received optical signal.

The VOA control unit 104 controls the optical level by the magneto-optical effect-type VOA 124 and the superimposition of the supervisory control signal by the magneto-optical effect-type VOA 124, by outputting driving voltage information to the VOA driving unit 112. The VOA control unit 104 may be realized by a digital circuit such as, for example, an FPGA. In the example depicted in FIG. 1, while the configuration having the VOA control unit 104 provided separately from the transceiver 101 is described, the VOA control unit 104 may be provided in the transceiver 101 (in, for example, the driving circuit 110). The configuration of the VOA control unit 104 will be described later (see, for example, FIG. 3).

Not limited to the configuration depicted in FIG. 1, various modifications may be made to the optical transmitting apparatus 100. For example, in the configuration depicted in FIG. 1, a configuration omitting the ROSA 130 and the PD driving unit 114 from the optical transmitting apparatus 100 may be employed.

The optical signal transmitted by the optical transmitting apparatus 100 includes the main signal and the supervisory control signal. The receiving apparatus that receives the optical signal transmitted from the optical transmitting apparatus 100, may separately extract the main signal and the supervisory control signal that are included in the optical signal from the optical transmitting apparatus 100 using, for example, frequency filters at an optical stage or an electric stage.

Figure 2:
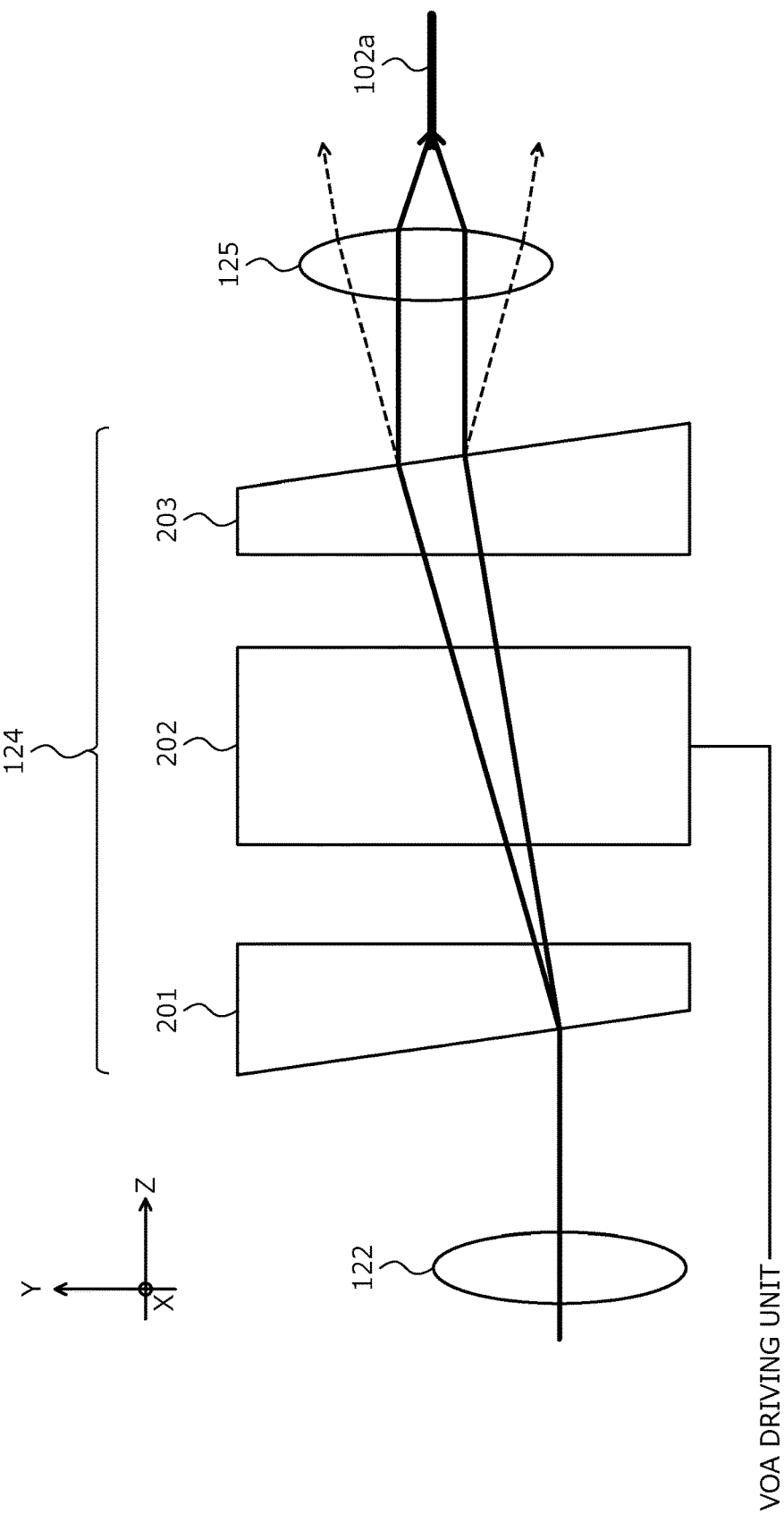
FIG. 2 is a diagram of an example of a magneto-optical effect-type VOA according to the first embodiment.

FIG. 2 is a diagram of an example of the magneto-optical effect-type VOA according to the first embodiment. In FIG. 2, a Z-axis represents the traveling direction of the light, a Y-axis represents a direction perpendicular to the Z-axis, and X-axis represents a direction perpendicular to the Z-axis and the Y-axis. In FIG. 2, components similar to components depicted in FIG. 1 are given the same reference numerals used in FIG. 1 and will not again be described. In FIG. 2, the lens 122, the magneto-optical effect-type VOA 124, the lens 125, and the optical fiber 102a are depicted among components of the configuration of the optical transmitting apparatus 100 depicted in FIG. 1.

As depicted in FIG. 2, for example, the magneto-optical effect-type VOA 124 includes a birefringent element 201, a variable Faraday rotator 202, and a birefringent element 203. The optical signal output from the lens 122 enters the birefringent element 201 of the magneto-optical effect-type VOA 124 through the optical isolator 123 (see, for example, FIG. 1).

The birefringent element 201 is a wedge-shaped birefringent prism formed having a thickness in the X-axis direction to be constant and having a thickness at a position in the Z-axis direction becoming larger as the position moves in a positive direction on the Y-axis. The birefringent element 201 separates the optical signal entering thereinto, into a first polarization component and a second polarization component by birefringence. The first polarization component is a polarization component of incoming collimated light, separated as an abnormal light by the birefringence. The second polarization component is a polarization component separated as a normal light by the birefringence.

Because the thickness of the birefringent element 201 in the Z-axis direction at a position becomes larger as the position moves in the positive direction on the Y-axis, the first polarization component and the second polarization component are separated along the Y-axis direction. The optical axis of the birefringent element 201 is in a direction parallel to the X-axis. The birefringent element 201 outputs the separated first polarization component and the second polarization component to the variable Faraday rotator 202.

The variable Faraday rotator 202 rotates, around the Z-axis as the rotation axis, the polarization plane of each of the first polarization component and the second polarization component output from the birefringent element 201, according to the driving signal output from the VOA driving unit 112. The variable Faraday rotator 202 outputs to the birefringent element 203, the first polarization component and the second polarization component whose polarization planes are rotated.

The birefringent element 203 is a wedge-shaped birefringent prism formed having a constant thickness along the X-axis direction and a thickness in the Z-axis direction at a position becoming larger as the position moves in a positive direction on the Y-axis. The birefringent element 203 causes the light output from the variable Faraday rotator 202 to undergo birefringence. The optical axis of the birefringent element 203 is in a direction rotated clockwise by about 45° from the negative side of the Z-axis in the positive direction relative to the optical axis of the birefringent element 201. The birefringent element 203 outputs the first polarization component and the second polarization component that each undergoes the birefringence, to the lens 125.

According to the configuration depicted in FIG. 2, the rotation angle of the variable Faraday rotator 202 is varied according to the driving signal from the VOA driving unit 112 to vary the coupling rate of the light condensed by the lens 125 to the optical fiber 102a. Thus, the optical attenuation amount (the amount of the optical attenuation) may be adjusted according to the driving signal from the VOA driving unit 112.

The coupling rate of the light in the optical monitor PD 127 (see, for example, FIG. 1) is also varied according to the driving signal from the VOA driving unit 112. The power of the light output from the TOSA 120 to enter the optical fiber 102*a* (the output light level) may be monitored using the signal output from the optical monitor PD 127.

As depicted in FIG. 2, the magneto-optical effect-type VOA 124 is arrange between the LD element 121 (the light source) and the optical fiber 102*a*, and is a magneto-optical effect-type variable optical attenuator that is spatially coupled to each of the LD element 121 and the optical fiber 102*a*.

Figure 3:
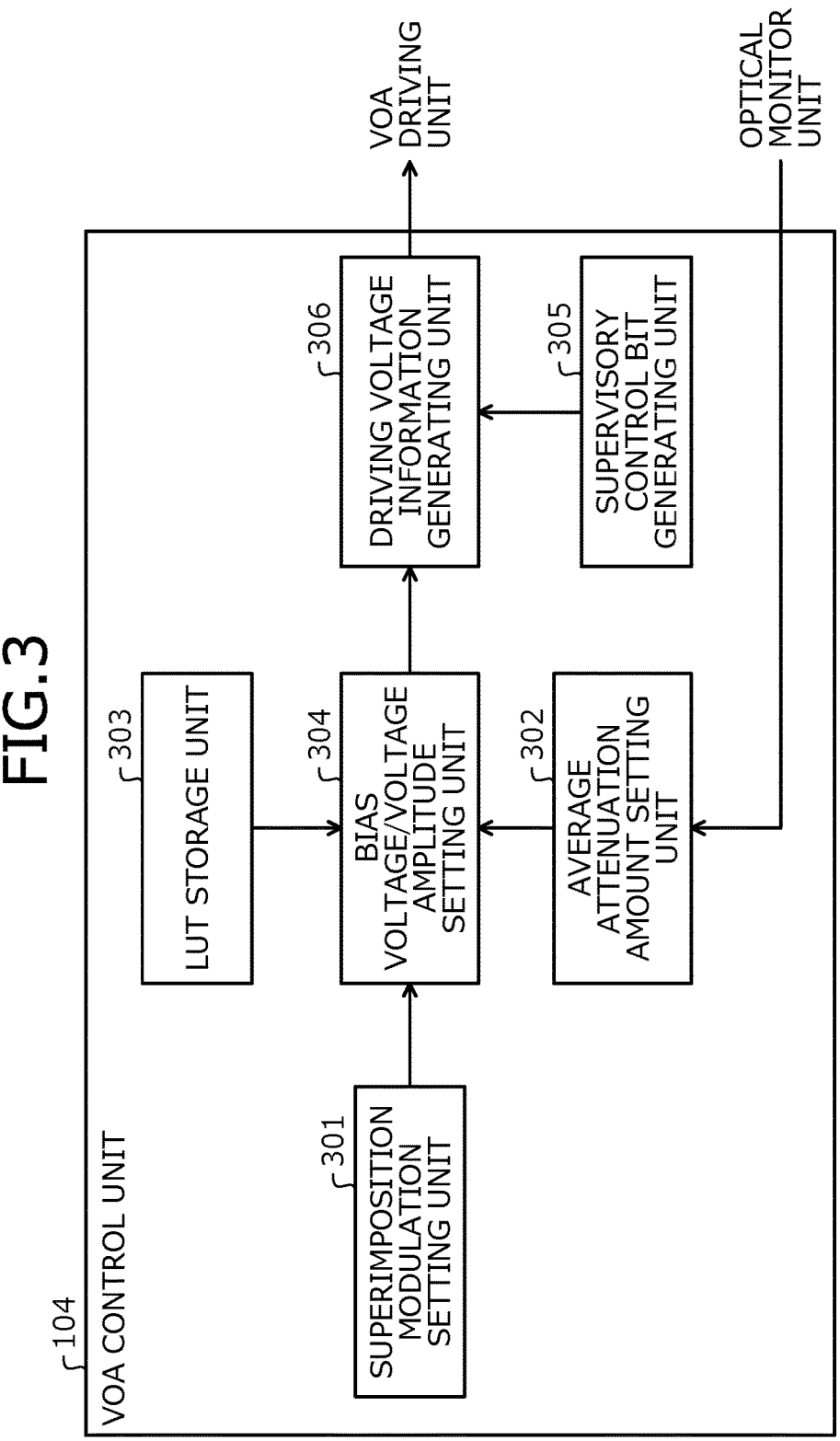
FIG. 3 is a diagram of an example of a VOA control unit according to the first embodiment.

FIG. 3 is a diagram of an example of the VOA control unit according to the first embodiment. As depicted in FIG. 3, for example, the VOA control unit 104 includes a superimposition modulation setting unit 301, an average attenuation amount setting unit 302, an LUT storage unit 303, a bias voltage/voltage amplitude setting unit 304, a supervisory control bit generating unit 305, and a driving voltage information generating unit 306. "LUT" is an abbreviation for Look Up Table.

The superimposition modulation setting unit 301 sets the superimposition modulation degree of the supervisory control signal by the magneto-optical effect-type VOA 124. The modulation degree is, for example, a ratio of the amplitude of a signal wave to that of the carrier wave. The modulation degree may be referred to as, for example, "modulation index" or "superimposition ratio". The superimposition modulation degree is, for example, a ratio of the amplitude of the modulation by the supervisory control signal executed for the optical signal to be the superimposition destination (the main signal), to the amplitude of the optical signal to be the superimposition destination (the main signal). For example, the superimposition modulation degree in a case where the optical signal to be the superimposition destination (the main signal) is modulated using a first amplitude and the magneto-optical effect-type VOA 124 executes modulation by the supervisory control signal using a second amplitude for the optical signal to be the superimposition destination (the main signal), may be represented by "the second amplitude/the first amplitude". The superimposition modulation degree of the supervisory control signal is set to be smaller than the modulation degree of the main signal.

For example, the superimposition modulation setting unit 301 determines a target value of the superimposition modulation degree of the supervisory control signal, and notifies the bias voltage/voltage amplitude setting unit 304 of the determined target value of the superimposition modulation degree. The determination of the target value of the superimposition modulation degree of the supervisory control signal by the superimposition modulation setting unit 301 is executed based on, for example, an external operation. Alternatively, the determination of the target value of the superimposition modulation degree of the supervisory control signal by the superimposition modulation setting unit 301 may be executed based on a predetermined value stored in a memory of the optical transmitting apparatus 100.

The average attenuation amount setting unit 302 sets the average attenuation amount in the magneto-optical effect-type VOA 124. The average attenuation amount is, for example, a median value of attenuation amounts of the light by the magneto-optical effect-type VOA 124. For example, the average attenuation amount in a case where the magneto-optical effect-type VOA 124 superimposes the supervisory control signal on the optical signal by switching the attenuation amount for the optical signal between a first attenuation amount and a second attenuation amount (the first attenuation amount<the second attenuation amount) may be represented by "(the second attenuation amount−the first attenuation amount)/2".

For example, the average attenuation amount setting unit 302 determines a target value of the average attenuation amount of the supervisory control signal, and notifies the bias voltage/voltage amplitude setting unit 304 of the determined target value of the average attenuation amount. The determination of the target value of the average attenuation amount of the supervisory control signal by the average attenuation amount setting unit 302 is executed based on, for example, an external operation. Alternatively, the determination of the target value of the average attenuation amount of the supervisory control signal by the average attenuation amount setting unit 302 may be executed based on a predetermined value stored in the memory of the optical transmitting apparatus 100. Alternatively, the determination of the target value of the average attenuation amount of the supervisory control signal by the average attenuation amount setting unit 302 may be executed based on the monitoring result of the output light level output from the optical monitor PD 127.

The LUT storage unit 303 is a memory storing therein the LUT that correlates a bias voltage and a voltage amplitude for each combination of the superimposition modulation degree and the average attenuation amount. Herein, as an example, the LUT stored in the LUT storage unit 303 includes, correlation information correlating the superimposition modulation degree and the bias voltage with each other and correlation information correlating the bias voltage and the superimposition modulation degree with each other.

The bias voltage/voltage amplitude setting unit 304 sets the bias voltage and the voltage amplitude of the magneto-optical effect-type VOA 124 based on the target values of the superimposition modulation degree and the average attenuation amount notified from the superimposition modulation setting unit 301 and the average attenuation amount setting unit 302, respectively. For example, the bias voltage/voltage amplitude setting unit 304 refers to the LUT stored in the LUT storage unit 303 and identifies the bias voltage and the voltage amplitude that correspond to the combination of the notified target values of the superimposition modulation degree and the average attenuation amount. The bias voltage/voltage amplitude setting unit 304 notifies the driving voltage information generating unit 306 of the identified bias voltage and the voltage amplitude.

The supervisory control bit generating unit 305 generates a supervisory control bit that indicates the supervisory control signal to be transmitted as the superimposition signal in response to, for example, an external input. The supervisory control bit generating unit 305 outputs the generated supervisory control bit to the driving voltage information generating unit 306.

The driving voltage information generating unit 306 generates driving voltage information based on the bias voltage and the voltage amplitude notified from the bias voltage/voltage amplitude setting unit 304 and the supervisory control bit output from the supervisory control bit generating unit 305. The driving voltage information is, for example, a digital signal that indicates the driving voltage to be applied to the magneto-optical effect-type VOA 124. The driving voltage information generating unit 306 outputs the generated driving voltage information to the VOA driving unit 112 (see, for example, FIG. 1).

For example, the driving voltage information generating unit 306 generates the driving voltage information indicating the driving signal by which the voltage becomes the bias voltage when the supervisory control bit is "0" and by which the voltage becomes the bias voltage+the voltage amplitude when the supervisory control bit is "1". Herein, as an example, it is assumed that the bias voltage is 500 [mV], the voltage amplitude is 10 [mV], and the supervisory control bits are "10110 . . . ". In this case, the driving voltage information generating unit 306 generates driving voltage information that indicates a driving signal whereby the voltage is varied to be 510 [mV], 500 [mV], 510 [mV], 510 [mV], and 500 [mV] in this order.

Alternatively, the driving voltage information generating unit 306 may generate driving voltage information that indicates a driving signal by which the voltage becomes "the bias voltage−the voltage amplitude/2" when the supervisory control bit is "0" and by which the voltage becomes "the bias voltage+the voltage amplitude/2" when the supervisory control bit is "1". As an example, it is assumed that the bias voltage is 500 [mV], the voltage amplitude is 10 [mV], and the supervisory control bits are "10110 . . . ". In this case, the driving voltage information generating unit 306 generates driving voltage information that indicates a driving signal whereby the voltage is varied to be 505 [mV], 495 [mV], 505 [mV], 505 [mV], and 495 [mV] in this order.

Figure 4:
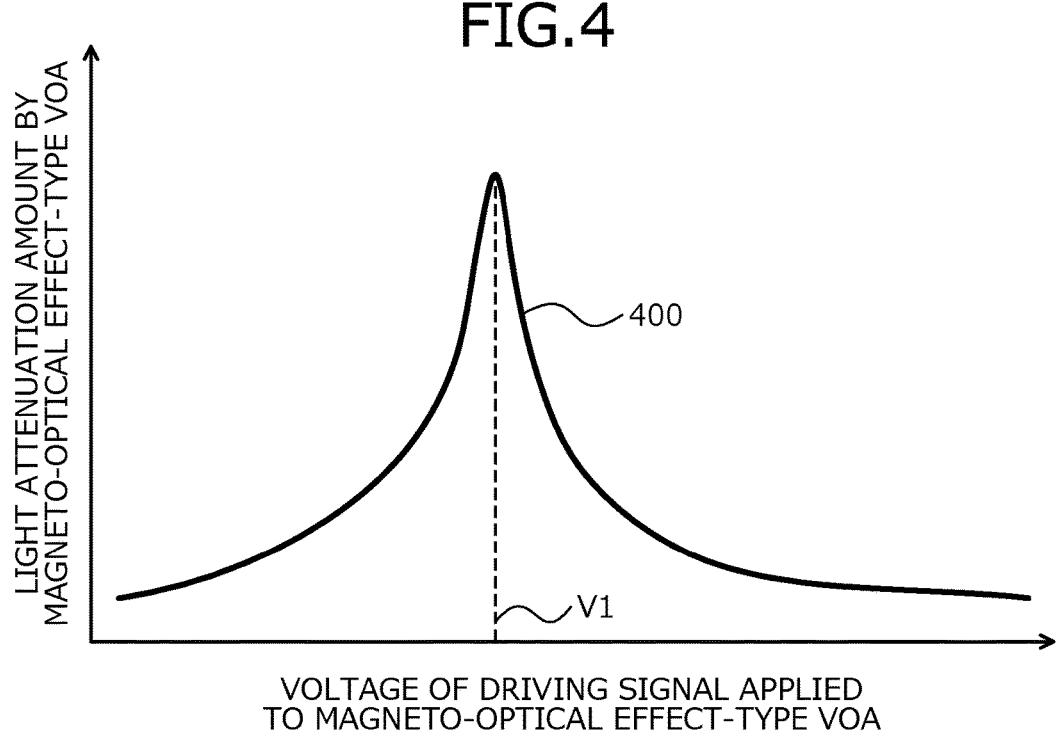
FIG. 4 is a graph of an example of characteristics of attenuation amount against applied voltage in the magneto-optical effect-type VOA according to the first embodiment.

FIG. 4 is a graph of an example of characteristics of the attenuation amount against the applied voltage in the magneto-optical effect-type VOA according to the first embodiment. In FIG. 4, the horizontal axis represents the voltage of the driving signal applied to the magneto-optical effect-type VOA 124 and the vertical axis represents the attenuation amount of the light by the magneto-optical effect-type VOA 124. Applied voltage attenuation amount characteristics 400 represent characteristics of the attenuation amount of the light by the magneto-optical effect-type VOA 124 against the voltage of the driving signal applied to the magneto-optical effect-type VOA 124.

For example, the applied voltage attenuation amount characteristics 400 are characteristics obtained by varying the voltage of the driving signal applied to the magneto-optical effect-type VOA 124, outputting light having predetermined power from the LD element 121 and comparing a predetermined power with the monitoring result obtained by the optical monitor unit 113.

As shown by the applied voltage attenuation amount characteristics 400, the attenuation amount of the light by the magneto-optical effect-type VOA 124 becomes maximal when the voltage of the driving signal becomes a voltage V1 whereby the coupling rate of the light in the optical fiber 102a becomes maximal. The attenuation amount of the light by the magneto-optical effect-type VOA 124 becomes smaller as the difference of the voltage of the driving signal and V1 increases.

The attenuation amount of the light by the magneto-optical effect-type VOA 124 varies non-linearly with respect to the voltage of the driving signal. The amount of variation of the attenuation amount (the slope of the attenuation amount with respect to the voltage of the driving signal) obtained when the voltage of the driving signal varies close to the voltage (varies a small amount) differs depending on the voltage of the driving signal. In other words, the amount of variation of the attenuation amount obtained when the voltage of the driving signal is varied by a specific amplitude according to the supervisory control signal (the superimposition modulation degree) differs depending on the bias voltage of the magneto-optical effect-type VOA 124.

FIG. 5 is a diagram of an example of the LUT according to the first embodiment. The LUT storage unit 303 depicted in FIG. 3 store therein, for example, a LUT 500 depicted in FIG. 5. The LUT 500 includes correlation information that correlates the average attenuation amount [dB] of the magneto-optical effect-type VOA 124 and the bias voltage [V] of the magneto-optical effect-type VOA 124 with each other. This correlation may be executed based on, for example, the applied voltage attenuation amount characteristics 400 depicted in FIG. 4. In this case, the voltage on the horizontal axis of the applied voltage attenuation amount characteristics 400 corresponds to the bias voltage and the attenuation amount on the vertical axis of the applied voltage attenuation amount characteristics 400 corresponds to the average attenuation amount.

For example, the LUT 500 depicted in FIG. 500 correlates the average attenuation amount=7.7 [dB] and the bias voltage=2.0 [V] with each other. This represents that, when 2.0 [V] as the driving signal is applied to the magneto-optical effect-type VOA 124, the attenuation amount of the magneto-optical effect-type VOA 124 is 7.7 [dB]. When the bias voltage of the magneto-optical effect-type VOA 124 is set to be 2.0 [V], the voltage of the driving signal corresponding to the supervisory control signal is varied centering around, for example, 2.0 [V] and the average attenuation amount of the magneto-optical effect-type VOA 124 is 7.7 [dB].

The LUT 500 correlates a combination of the bias voltage [V] and the superimposition modulation degree [%] of the magneto-optical effect-type VOA 124, and the voltage amplitude [mV] of the magneto-optical effect-type VOA 124 with each other. For example, the attenuation amount may be measured by changing the combination of the bias voltage and the voltage amplitude of the magneto-optical effect-type VOA 124 outputting light having predetermined power from the LD element 121, and comparing the predetermined power with the monitoring result obtained by the optical monitor unit 113. The superimposition modulation degree may be determined by comparing the measured attenuation amount with the modulation degree of the main signal. Thus, the LUT 500 may be formed that correlates the combination of the bias voltage [V] and the superimposition modulation degree [%], and the voltage amplitude [mV] with each other.

For example, the LUT 500 depicted in FIG. 5 correlates the combination of the bias voltage=2.0 [V] and the superimposition modulation degree=10[%], and the voltage amplitude=±500 [mV] with each other. This represents that the voltage amplitude is ±500 [mV] whereby the superimposition modulation degree becomes 10[%] when the bias voltage is set to be 2.0 [V].

As depicted in FIG. 5, the LUT 500 is the data according to the characteristics (the applied voltage attenuation amount characteristics 400) between the voltage of the driving signal of the magneto-optical effect-type VOA 124 and the attenuation amount of the light by the magneto-optical effect-type VOA 124.

Figure 6:
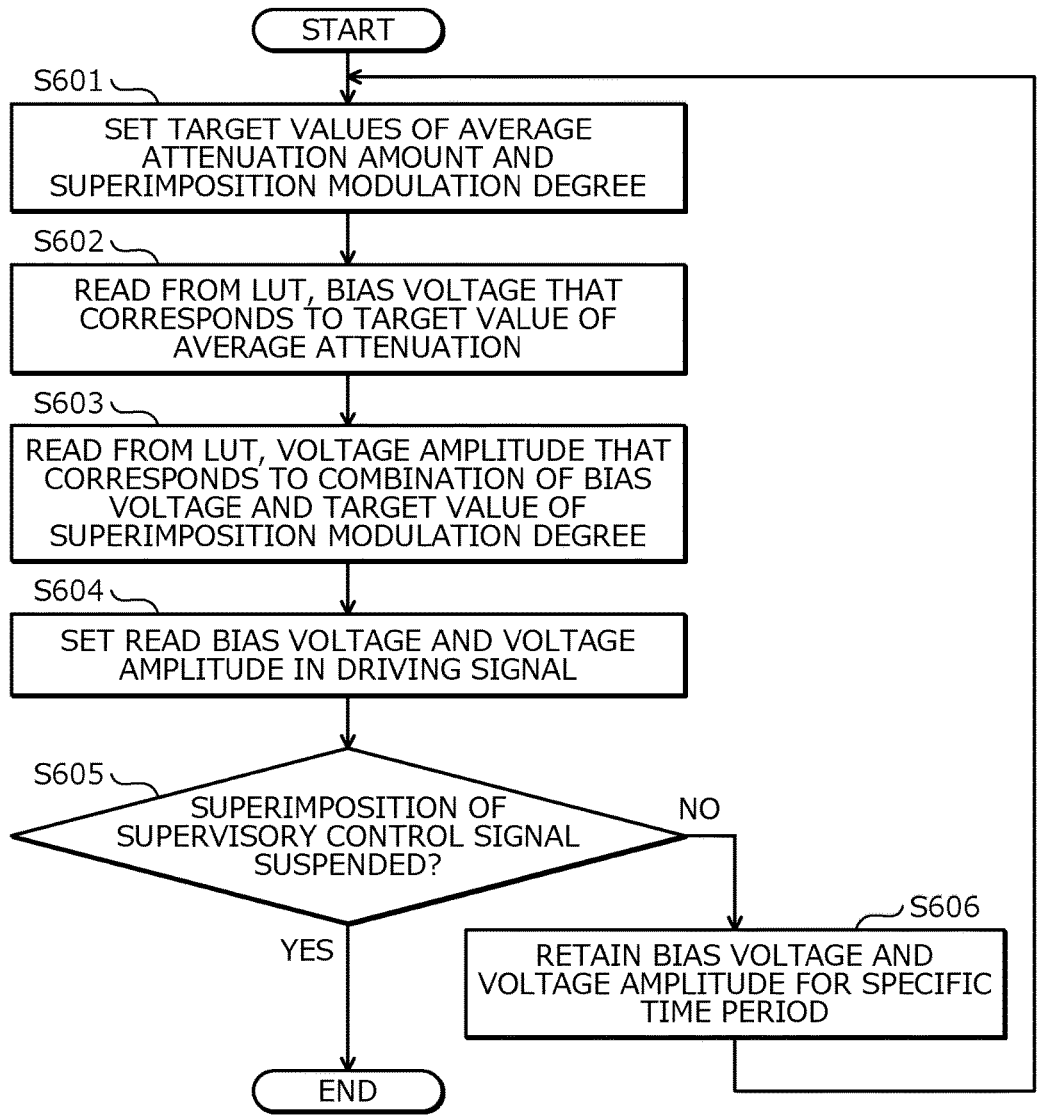
FIG. 6 is a flowchart of an example of a process executed by the VOA control unit according to the first embodiment.

FIG. 6 is a flowchart of an example of a process executed by the VOA control unit according to the first embodiment. The VOA control unit 104 according to the first embodiment executes steps depicted in, for example, FIG. 6 when the supervisory control signal is superimposed on the main signal using the magneto-optical effect-type VOA 124.

The VOA control unit 104 sets the target values of the average attenuation amount and the superimposition modulation degree in the magneto-optical effect-type VOA 124 (step S601). The setting of the target value of the average attenuation amount at step S601 is executed by the average attenuation amount setting unit 302 depicted in, for example, FIG. 3. The setting of the target value of the superimposition modulation degree at step S601 is executed by the superimposition modulation setting unit 301 depicted in, for example, FIG. 3.

The VOA control unit 104 reads from the LUT 500 of the LUT storage unit 303, the bias voltage that corresponds to the target value of the average attenuation amount set at step S601 (step S602). Step S602 is executed by the bias voltage/voltage amplitude setting unit 304 depicted in, for example, FIG. 3.

The VOA control unit 104 reads from the LUT 500, a voltage amplitude that corresponds to the combination of the bias voltage read at step S602 and the target value of the superimposition modulation degree set at step S601 (step S603). Step S603 is executed by the bias voltage/voltage amplitude setting unit 304 depicted in, for example, FIG. 3.

The VOA control unit 104 sets the bias voltage and the voltage amplitude read respectively at steps S602 and S603 in the driving signal (step S604). For example, the VOA control unit 104 outputs to the VOS driving unit 112, the driving voltage information based on the read bias voltage, the read voltage amplitude, and the control supervisory bit to be superimposed and thereby sets the read bias voltage and the read voltage amplitude in the driving signal. Step S604 is executed by the supervisory control bit generating unit 305 depicted in, for example, FIG. 3. The generation of the control supervisory bit to be superimposed is executed by the supervisory control bit generating unit 305 depicted in, for example, FIG. 3.

The VOA control unit 104 determines whether the superimposition of the supervisory control signal on the main signal is suspended (step S605). For example, the VOA control unit 104 executes the determination at step 605 based on presence or absence of the supervisory control signal to be superimposed, an external suspension instruction, or the like. When the VOA control unit 104 determines that the superimposition is not suspended (step S605: NO), the VOA control unit 104 retains the bias voltage and the voltage amplitude of the driving signal set at step S605 for a specific time period (step S606) and returns to step S601. When the target values of the average attenuation amount and the superimposition modulation degree are not to be updated, the VOA control unit 104 may return from step S606 to step S602.

When the VOA control unit 104 determines at step S605 that the superimposition is suspended (step S605: YES), the VOA control unit 104 causes the series of operations to come to an end. In this case, for example, the VOA control unit 104 may transition to a state where the VOA control unit 104 outputs to the VOA driving unit 112, driving voltage information indicating the driving signal that becomes constant at the bias voltage finally read at step S602. This establishes a state where the supervisory control signal is not superimposed on the main signal by the magneto-optical effect-type VOA 124 and the power control of the optical signal is executed by the magneto-optical effect-type VOA 124.

Figure 7:
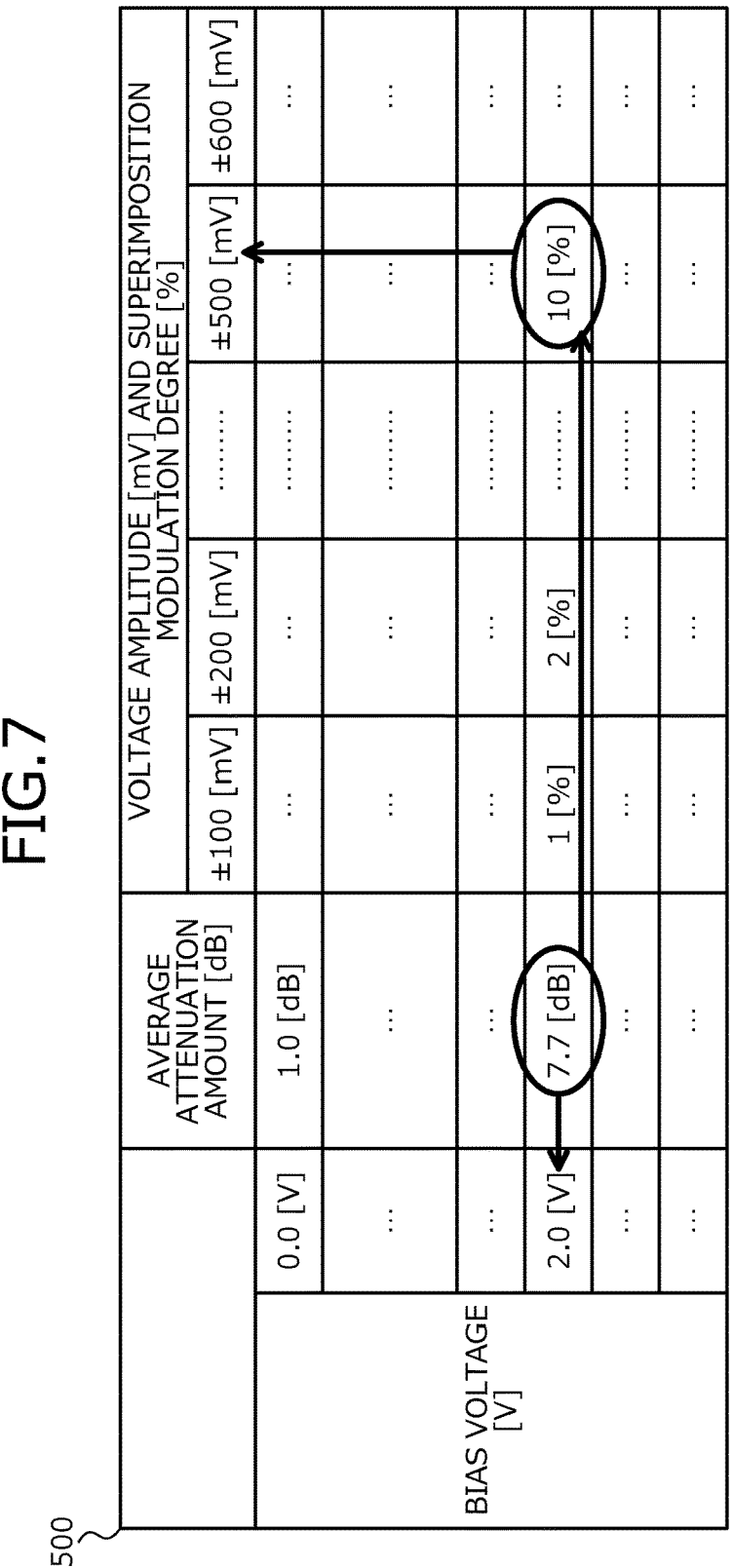
FIG. 7 is a diagram of an example of setting of bias voltage and voltage amplitude by the VOA control unit according to the first embodiment.

FIG. 7 is a diagram of an example of the setting of the bias voltage and the voltage amplitude by the VOA control unit according to the first embodiment. In FIG. 7, the components similar the components depicted in FIG. 5 are given the same reference numerals used in FIG. 5 and will not again be described. For example, it is assumed that, at step S601 depicted in FIG. 6, the target value of the average attenuation amount is set to be 7.7 [dB] and the target value of the superimposition modulation degree is set to be 10[%].

In this case, at step S602 depicted in FIG. 6, the bias voltage=2.0 [V] corresponding to the average attenuation amount=7.7 [dB] is read from the LUT 500. At step S603 depicted in FIG. 6, the voltage amplitude=±500 [mV] corresponding to the combination of the bias voltage=2.0 [V] and the superimposition modulation degree=10[%] is read.

At step S604 depicted in FIG. 6, the bias voltage=2.0 [V] and the voltage amplitude=±500 [mV] are set in the driving signal. For example, a driving signal whose voltage is varied to be 1.5 [V] or 2.5 [V] according to the value of the supervisory control bit is thereby applied to the magneto-optical effect-type VOA 124.

Figure 8:
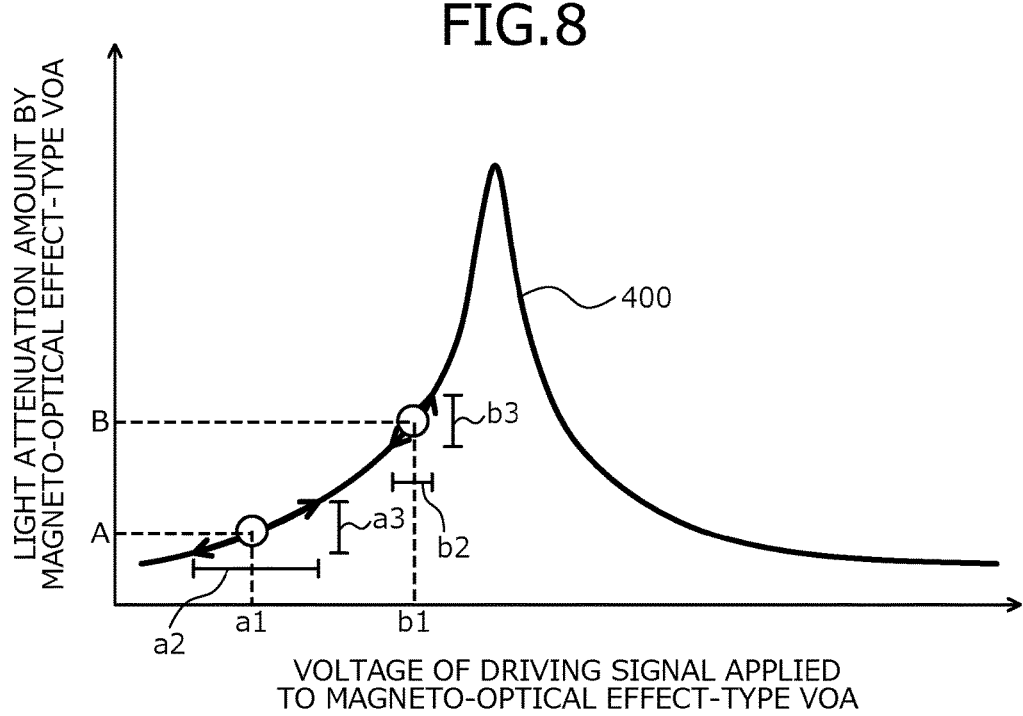
FIG. 8 is a graph of an example of the bias voltage and the voltage amplitude that are set by the VOA control unit according to the first embodiment.

FIG. 8 is a graph of an example of the bias voltage and the voltage amplitude that are set by the VOA control unit according to the first embodiment. In FIG. 8, components similar to the components depicted in FIG. 4 are given the same reference numerals used in FIG. 4 and will not again be described. For example, when the VOA control unit 104 sets A as the target value of the average attenuation amount, the VOA control unit 104 sets the bias voltage=a1, which corresponds to the average attenuation amount=A in the LUT 500 based on the applied voltage attenuation amount characteristics 400. The VOA control unit 104 sets the voltage amplitude=a2 based on the combination of the bias voltage=a1 and the target value of the superimposition modulation degree in the LUT 500 based on the applied voltage attenuation amount characteristics 400.

The variation amount a3 is a variation amount of the attenuation amount (the variation width) of the magneto-optical effect-type VOA 124 when the driving signal of the bias voltage=a1 and the voltage amplitude=a2 is applied to the magneto-optical effect-type VOA 124. The voltage amplitude=a2 is set in the LUT 500 based on the applied voltage attenuation amount characteristics 400 such that the variation amount a3 becomes the variation amount that corresponds to the target value of the superimposition modulation degree.

When the VOA control unit 104 selects B as the target value of the average attenuation amount, the VOA control unit 104 sets the bias voltage=b1 that corresponds to the average attenuation amount=B in the LUT 500 based on the applied voltage attenuation amount characteristics 400. The VOA control unit 104 sets the voltage amplitude=b2 based on the combination of the bias voltage=b1 and the target value of the superimposition modulation degree in the LUT 500 based on the applied voltage attenuation amount characteristics 400.

The variation amount a3 is a variation amount of the attenuation amount (the variation width) of the magneto-optical effect-type VOA 124 when the driving signal of the bias voltage=a1 and the voltage amplitude=a2 is applied to the magneto-optical effect-type VOA 124. The voltage amplitude=b2 is set in the LUT 500 based on the applied voltage attenuation amount characteristics 400 such that the variation amount b3 becomes the variation amount corresponding to the target value of the superimposition modulation degree.

As depicted in FIG. 8, the slope of the attenuation amount of the magneto-optical effect-type VOA 124 with respect to the voltage of the driving signal differs between a case where the average attenuation amount is set to be A (the bias voltage is set to be a1) and a case where the average attenuation amount is set to be B (the bias voltage is set to be b1). Therefore, assuming that the voltage amplitude is constant, the variation amount of the attenuation amount according to the value of the supervisory control bit (the superimposition modulation degree) differs depending on the set average attenuation amount (the bias voltage).

The modulation degree of the superimposition signal is varied according to the average attenuation amount by the magneto-optical effect-type VOA 124 for the power control of the optical signal, and no desired superimposition modulation degree may be acquired. In this case, for example, no desired signal to noise ratio (SNR) may be acquired thereby causing decreases in the transmission efficiency, degradation of the reception quality, and the like.

In contrast, the VOA control unit 104 may obtain a predetermined superimposition modulation degree by using the voltage amplitude corresponding to the average attenuation amount (the bias voltage) of the driving signal, for the driving signal. In the example depicted in FIG. 8, substantially equal variation amounts a3 and b3 are obtained in the case where the average attenuation amount is set to be A (the bias voltage is set to be a1) and the case where the average attenuation amount is set to be B (the bias voltage is set to be b1).

As described, according to the optical transmitting apparatus 100 of the first embodiment, the variable optical attenuator of the magneto-optical effect type (the magneto-optical effect-type VOA 124) is arranged by spatial coupling between the light source (the LD element 121) and the optical fiber (the optical fiber 102a). This facilitates implementation of the variable optical attenuator in the optical transmitter (the TOSA 120) whereby decreases in the size of the optical transmitting apparatus 100 may be facilitated.

The driving voltage of the variable optical attenuator (the voltage of the driving signal) may be generated based on the information to be superimposed on light, and the bias of the driving voltage to be generated (the bias voltage of the driving signal) may be controlled. Thus, a single variable optical attenuator may be used as an optical attenuator controlling the average attenuation amount (the average attenuation amount) of the light and a superimposing device executing the superimposition of the information (the supervisory control signal) on the light. Thus, the number of parts of the optical transmitting apparatus 100 may be reduced, enabling reductions in the cost of parts to be facilitated.

In addition, the amplitude of the generated driving voltage (the voltage amplitude of the driving signal) may be controlled. Thus, the degree of modulation in the superimposition of the information on the light may be controlled. A predetermined degree of modulation may be obtained in the superimposition of the information on the light even when the average attenuation amount of the light is controlled, by controlling the amplitude of the driving voltage based on the data (the LUT 500) according to the characteristics between the driving voltage of the variable optical attenuator and the attenuation amount of the light by the variable optical attenuator. Thus, the control of the optical level and the superimposition of the information at a predetermined modulation degree may be realized by a single variable optical attenuator. The control of the optical level and the superimposition of the information may be realized by a single variable optical attenuator of the magneto-optical type, capable of being arranged in a limited space, that is, a space between the light source and the optical fiber.

The data according to the characteristics between the driving voltage of the variable optical attenuator and the attenuation amount of the light by the variable optical attenuator is, for example, data correlating the combination of the driving voltage and the modulation degree in the superimposition of the information on the light by the variable optical attenuator, and the amplitude of the driving voltage with each other. In this case, the optical transmitting apparatus 100 first determines the bias of the driving voltage, and identifies the amplitude of the driving voltage corresponding to the combination of the determined bias of the driving voltage and the target value of the modulation degree in the superimposition of the information on the light by the variable optical attenuator, based on the above data.

The optical transmitting apparatus 100 controls the bias of the driving voltage to be generated to become the determined bias of the driving voltage, and controls the amplitude of the driving voltage to be generated to become the determined amplitude of the driving voltage. Thus, the amplitude of the driving voltage may be controlled such that the modulation degree becomes the target value in the relation with the bias of the driving voltage to be controlled.

A second embodiment will be described in terms of portions differing from the first embodiment. In the second embodiment, a configuration will be described in which the driving signal is controlled based on the monitoring result of the level of the light attenuated by the magneto-optical effect-type VOA 124 without using the LUT 500.

FIG. 9 is a diagram of an example of a VOA control unit according to the second embodiment. In FIG. 9, components similar to the components depicted in FIG. 3 are given the same reference numerals used in FIG. 3 and will not again be described. As depicted in FIG. 9, the VOA control unit 104 according to the second embodiment may be configured omitting the LUT storage unit 303 depicted in FIG. 3.

In this case, the bias voltage/voltage amplitude setting unit 304 calculates the average attenuation amount of the magneto-optical effect-type VOA 124 based on the monitoring result of the output light level output from the optical monitor unit 113, while varying the bias voltage notified to the driving voltage information generating unit 306. For example, the bias voltage/voltage amplitude setting unit 304 calculates the average attenuation amount of the magneto-optical effect-type VOA 124 based on the difference between the output power of the LD element 121 and the monitoring result of the output light level output from the optical monitor unit 113. The calculation of the average attenuation amount of the magneto-optical effect-type VOA 124 in a state where the supervisory control signal is superimposed on the optical signal by the magneto-optical effect-type VOA 124 will be described later.

When the calculated average attenuation amount becomes the target value of the average attenuation amount notified from the average attenuation amount setting unit 302, the bias voltage/voltage amplitude setting unit 304 fixes the bias voltage to be notified to the driving voltage information generating unit 306. The bias voltage of the driving voltage of the magneto-optical effect-type VOA 124, by which the average attenuation amount becomes the target value may be set.

The bias voltage/voltage amplitude setting unit 304 calculates the superimposition modulation degree of the magneto-optical effect-type VOA 124 based on the monitoring result of the output light level output from the optical monitor unit 113, while varying the voltage amplitude to be notified to the driving voltage information generating unit 306. For example, the VOA control unit 104 calculates the superimposition modulation degree based on the ratio of the amplitude in the modulation of the main signal by the LD element 121 and the variation amount (the amplitude) of the monitoring result of the output light level output from the optical monitor unit 113.

When the calculated superimposition modulation degree becomes the target value of the superimposition modulation degree notified from the superimposition modulation setting unit 301, the bias voltage/voltage amplitude setting unit 304 fixes the voltage amplitude to be notified to the driving voltage information generating unit 306. The voltage amplitude of the driving voltage of the magneto-optical effect-type VOA 124 may be set to that by which the superimposition modulation degree becomes the target value.

The calculation of the average attenuation amount of the magneto-optical effect-type VOA 124 in a state where the supervisory control signal is superimposed on the optical signal by the magneto-optical effect-type VOA 124 will be described. For example, the bias voltage/voltage amplitude setting unit 304 may calculate the average attenuation amount by averaging the monitoring results of the output light level during a predetermined time period. The average attenuation amount of the magneto-optical effect-type VOA 124 may be calculated using a simple process.

The bias voltage/voltage amplitude setting unit 304 acquires the value of the supervisory control signal at a time point, the bias voltage of the driving signal at the time point, and the voltage amplitude of the driving signal at the time point. The value of the supervisory control signal at a time point may be obtained from, for example, the supervisory control bit generating unit 305. The bias voltage and the voltage amplitude of the driving signal at a time point are the bias voltage and the voltage amplitude set by the bias voltage/voltage amplitude setting unit 304 at the time point.

The bias voltage/voltage amplitude setting unit 304 obtains the data indicating the characteristics between the voltage and the attenuation amount of the driving signal in the magneto-optical effect-type VOA 124 (the applied voltage attenuation amount characteristics 400). This data is stored in, for example, the memory of the optical transmitting apparatus 100. The bias voltage/voltage amplitude setting unit 304 calculates a value representing the variation amount of the attenuation amount of the magneto-optical effect-type VOA 124 by the superimposition of the supervisory control signal at the time point based on the obtained values, the bias voltage and the voltage amplitude, and the obtained data.

Herein, as an example, when the obtained value of the supervisory control signal is "1", the bias voltage/voltage amplitude setting unit 304 calculates a value representing the difference between the attenuation amount corresponding to the bias voltage and the attenuation amount corresponding to "the bias voltage+the voltage amplitude/2", in the applied voltage attenuation amount characteristics 400. When the obtained value of the supervisory control signal is "0", the bias voltage/voltage amplitude setting unit 304 calculates a value representing the difference between the attenuation amount corresponding to the bias voltage and the attenuation amount corresponding to "the bias voltage−the voltage amplitude/2", in the applied voltage attenuation amount characteristics 400.

The bias voltage/voltage amplitude setting unit 304 subtracts the calculated value from the monitoring result of the output light level at the time point and thereby, calculates the average attenuation amount of the magneto-optical effect-type VOA 124. Thus, the average attenuation amount of the magneto-optical effect-type VOA 124 may be accurately calculated.

FIG. 10 is a flowchart of an example of an optical level control process executed by the VOA control unit according to the second embodiment. The VOA control unit 104 according to the second embodiment executes steps depicted in, for example, FIG. 10 when the supervisory control signal is superimposed on the main signal using the magneto-optical effect-type VOA 124.

The VOA control unit 104 sets the target values of the average attenuation amount and the superimposition modulation degree in the magneto-optical effect-type VOA 124 (step S1001). The setting of the target value of the average attenuation amount executed at step S1001 is executed by the average attenuation amount setting unit 302 depicted in, for example, FIG. 9. The setting of the target value of the superimposition modulation degree executed at step S1001 is executed by the superimposition modulation setting unit 301 depicted in, for example, FIG. 9.

The VOA control unit 104 varies the bias voltage of the driving signal of the magneto-optical effect-type VOA 124 (step S1002). For example, it is assumed that, at the start of each of the steps depicted in FIG. 10, the bias voltage of the driving signal of the magneto-optical effect-type VOA 124 is set to be the lowest bias voltage of the bias voltages assumed to be used. In this case, at step S1002, the VOA control unit 104 increases the bias voltage of the driving signal by a predetermined unit amount. Alternatively, at the start of each of the steps depicted in FIG. 10, the bias voltage of the driving signal of the magneto-optical effect-type VOA 124 may be set to be the highest bias voltage of the bias voltages assumed to be used. In this case, at step S1002, the VOA control unit 104 lowers the bias voltage of the driving signal by a predetermined unit amount. Step S1002 is executed by varying the bias voltage notified by the bias voltage/voltage amplitude setting unit 304 to the driving voltage information generating unit 306 depicted in, for example, FIG. 9.

The VOA control unit 104 calculates the average attenuation amount of the magneto-optical effect-type VOA 124 based on the monitoring result of the output light level output from the optical monitor unit 113 (step S1003). The above calculation methods may be used for the calculation of the average attenuation amount executed at step S1003. Step S1003 is executed by the bias voltage/voltage amplitude setting unit 304 depicted in, for example, FIG. 9.

The VOA control unit 104 determines whether the average attenuation amount calculated at step S1003 reaches the target value of the average attenuation amount set at step S1001 (step S1004). For example, the VOA control unit 104 determines that the average attenuation amount does not yet reach the target value when the difference (an absolute value) between the calculated average attenuation amount and the target value is equal to or greater than a threshold value, and determines that the average attenuation amount reaches the target value when the difference (an absolute value) is smaller than the threshold value. Step S1004 is executed by the bias voltage/voltage amplitude setting unit 304 depicted in, for example, FIG. 9. When the VOA control unit 104 determines that the average attenuation amount does not yet reach the target value (step S1004: NO), the VOA control unit 104 returns to step S1002.

When the VOA control unit 104 determines at step S1004 that the average attenuation amount reaches the target value (step S1004: YES), the VOA control unit 104 varies the voltage amplitude of the driving signal of the magneto-optical effect-type VOA 124 (step S1005). For example, it is assumed that, at the start of each of the steps depicted in FIG. 10, the voltage amplitude of the driving signal of the magneto-optical effect-type VOA 124 is set to be the smallest voltage amplitude of the voltages amplitudes assumed to be used. In this case, at step S1005, the VOA control unit 104 increases the voltage amplitude of the driving signal by a predetermined unit amount. Alternatively, the voltage amplitude of the driving signal of the magneto-optical effect-type VOA 124 at the start of each of the steps depicted in FIG. 10 may be set to be the largest voltage amplitude of the voltage amplitudes assumed to be used. In this case, at step S1005, the VOA control unit 104 reduces the voltage amplitude of the driving signal by a predetermined unit amount. Step S1005 is executed by varying the voltage amplitude to be notified to the driving voltage information generating unit 306 depicted in, for example, FIG. 9, by the bias voltage/voltage amplitude setting unit 304.

The VOA control unit 104 calculates the superimposition modulation degree of the magneto-optical effect-type VOA 124 based on the monitoring result of the output light level output from the optical monitor unit 113 (step S1006). For example, the VOA control unit 104 calculates the superimposition modulation degree based on the ratio of the amplitude in the modulation of the main signal by the LD element 121 and the variation amount (the amplitude) of the monitoring result of the output light level output from the optical monitor unit 113. Step S1006 is executed by the bias voltage/voltage amplitude setting unit 304 depicted in, for example, FIG. 9.

The VOA control unit 104 determines whether the superimposition modulation degree calculated at step S1006 reaches the target value of the superimposition modulation degree set at step S1001 (step S1007). For example, the VOA control unit 104 determines that the superimposition modulation degree does not yet reach the target value when the difference (an absolute value) between the calculated superimposition modulation degree and the target value is equal to or greater than a threshold value, and determines that the superimposition modulation degree reaches the target value when the difference (an absolute value) is smaller than the threshold value. Step S1007 is executed by the bias voltage/voltage amplitude setting unit 304 depicted in, for example, FIG. 9. When the VOA control unit 104 determines that the superimposition modulation degree does not yet reach the target value (step S1007: NO), the VOA control unit 104 returns to step S1005.

When the VOA control unit 104 determines at step S1007 that the superimposition modulation degree reaches the target value (step S1007: YES), the VOA control unit 104 transitions to step S1008. Steps S1008 and S1009 depicted in FIG. 10 are similar to steps S605 and S606 depicted in FIG. 6. At step S1009, the VOA control unit 104 retains for a specific time period, the bias voltage and the voltage amplitude of the driving signal acquired when the VOA control unit 104 transitions to step S1009.

As described, according to the optical transmitting apparatus 100 according to the second embodiment, after controlling the bias of the driving voltage, the amplitude of the driving voltage may be controlled based on the monitoring result of the light level attenuated by the variable optical attenuator (the magneto-optical effect-type VOA 124). A predetermined modulation degree may thereby be obtained in the superimposition of the information on the light even when the average attenuation amount of the light is controlled. Thus, the control of the light level and the superimposition of the information at a predetermined modulation degree may be realized by a single variable optical attenuator.

For example, the optical transmitting apparatus 100 calculates the modulation degree (the superimposition modulation degree) by the variable optical attenuator, based on the monitoring result of the light level attenuated by the variable optical attenuator, and controls the amplitude of the driving voltage based on the result of the comparison between the calculated modulation degree and the target value. Thus, a predetermined modulation degree may be obtained in the superimposition of the information on the light even when the average attenuation amount of the light is controlled.

The amplitude of the driving voltage may be controlled without using the data (for example, the LUT 500) corresponding to the characteristics between the driving voltage of the variable optical attenuator and the attenuation amount of the light by the variable optical attenuator. For example, a predetermined modulation degree may therefore be obtained in the superimposition of the information on the light even when the characteristics between the driving voltage of the variable optical attenuator and the attenuation amount of the light by the variable optical attenuator vary.

The optical transmitting apparatus 100 may calculate the average attenuation amount of the light by the variable optical attenuator based on the monitoring result of the level of the light, and may control the bias of the generated driving voltage based on the result of the comparison between the calculated average attenuation amount and the target value.

In this case, for example, the optical transmitting apparatus 100 calculates the average attenuation amount of the light by the variable optical attenuator by averaging the monitoring results of the level of the light. Thus, the average attenuation amount of the light by the variable optical attenuator may be calculated using a simple process and the light level may be controlled even when the light has the information superimposed thereon.

The optical transmitting apparatus 100 may calculate a value that is based on the value of the information to be superimposed, the bias of the driving voltage and the amplitude of the driving voltage, and data indicating the characteristics between the driving voltage and the attenuation amount of the light by the variable optical attenuator, at a time point. The optical transmitting apparatus 100 may calculate the average attenuation amount of the light by the variable optical attenuator by subtracting the calculated value from the monitoring result of the level of the light at the time point. Thus, the average attenuation amount of the light by the variable optical attenuator may be accurately calculated and the light level may precisely be controlled even when the light has the information superimposed thereon.

A configuration having therein the first and the second embodiments combined with each other may be employed. For example, a configuration may be employed in which the bias voltage of the driving signal of the magneto-optical effect-type VOA 124 is controlled based on the monitoring result of the light level as in the second embodiment and the voltage amplitude of the driving signal is controlled based on the LUT 500 as in the first embodiment. With this configuration, for example, the optical transmitting apparatus 100 may also calculate the average attenuation amount of the light by the variable optical attenuator based on the monitoring result of the light level and may control the bias of the generated driving voltage based on the result of the comparison between the calculated average attenuation amount and the target value. For the calculation of the average attenuation amount of the light by the variable optical attenuator in this case, the calculation method described in the second embodiment may be used.

As described, according to the optical transmitting apparatus and the optical level control method, the control of the optical level and the superimposition of the information may be realized by a single variable optical attenuator.

For example, mobile traffic has rapidly increased and associated with this, the traffic has also increased in access areas such as a mobile backhaul network that connects a mobile base station and the accommodating stations thereof. Application of a DWDM technique to the access area is therefore under consideration. "DWDM" is an abbreviation for Dense Wavelength Division Multiplexing.

For example, for ITU-T, realization of simple and inexpensive configuration by commonalizing (reducing the number of types of) the apparatuses for users, called TEE, by using a wavelength-variable light source as the transmission light source is under consideration. "ITU-T" is an abbreviation for International Telecommunication Union-Telecommunication sector. "TEE" is an abbreviation for Tail-End Equipment.

The setting of the wavelength of the wavelength-variable light source of each TEE is executed by, for example, superimposing a supervisory control signal on a main signal from an apparatus of the center called HEE. "HEE" is an abbreviation for Head-End Equipment. For the superimposition transmission of the supervisory control signal, a method is demanded that enables superimposition and detection not dependent on the frame format of the main signal (independent of the frame format).

For example, an electric stage superimposition method and an optical stage superimposition method are conventionally present as the superimposition methods for the supervisory control signal. The electric stage superimposition method is a method in which the main signal and the superimposition signal are coupled with each other by an RF coupler or the like, and an optical transceiver is driven by the coupled electric signal. "RF" is an abbreviation for Radio Frequency (high frequency). With the electric stage superimposition method, addition of inexpensive parts such as the RF coupler is sufficient and the cost for the addition has to be low once the design is completed. With the electric stage superimposition method, the superimposition signal, however, corresponds to noise for the main signal and degradation of the main signal and the superimposition signal tends to be generated separately from the degradation of the eye pattern due to the superimposition.

The optical stage superimposition method is a method of superimposing by applying weak modulation in the optical stage of the main signal using a VOA or an optical modulator. With the optical stage superimposition method, no degradation factor other than the eye pattern degradation is present and the degradation of the main signal and the superimposition signal is moderate because the superimposition is executed in the optical stage. With the conventional optical stage superimposition method, addition of the optical parts for the superimposition (for example, an external VOA for the transceiver) is, however, necessary and the cost for the addition is high and the size of the transceiver is increased.

In contrast, according to the embodiments, the optical stage superimposition method may be realized using the magneto-optical effect-type VOA. Different from a waveguide-type modulator or VOA, the magneto-optical effect-type VOA is a spatial coupling-type device and therefore, may be arranged between, for example, the optical connection of a semiconductor laser and an optical fiber. A VOA for superimposition may be implemented in a TOSA module and reduction of the size of the apparatus may be facilitated.

This magneto-optical effect-type VOA simultaneously acts as an optical attenuator controlling the light level of the transceiver and a superimposing device superimposing a supervisory control signal on light. Control of the light level and superimposition of the supervisory control signal may be realized by a single variable optical attenuator.

With the magneto-optical effect-type VOA, because the variation rate of the attenuation differs depending on the average attenuation amount, no desired modulation degree may be obtained as a superimposing device assuming that the control as an optical attenuator and the control as a superimposing device are merely simply combined with each other. In contrast, according to the embodiments, the amplitude of the driving voltage of the VOA may be controlled according to the bias of the driving voltage of the VOA to be controlled. The superimposition at a predetermined modulation degree is thereby enabled.

According to one aspect of the present invention, an effect is achieved in that control of the optical level and the superimposing of information may be realized by a single variable optical attenuator.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmitting apparatus comprising:
    a variable optical attenuator of a magneto-optical effect type disposed by spatial coupling between a light source and an optical fiber, the variable optical attenuator configured to attenuate light output from the light source and coupled to the optical fiber, according to an input driving voltage;
    a generator configured to generate the driving voltage of the variable optical attenuator based on information to be superimposed on the light by the variable optical attenuator, the generator inputting the generated driving voltage into the variable optical attenuator; and
    a controller configured to control a bias of the driving voltage generated by the generator, the controller controlling an amplitude of the driving voltage generated by the generator, based on data according to characteristics between the driving voltage and an attenuation amount of the light by the variable optical attenuator.

2. The optical transmitting apparatus according to claim 1, wherein
    the controller controls an average attenuation amount of the light by the variable optical attenuator by controlling the bias of the driving voltage, and controls a modulation degree in superimposition of the information on the light by the variable optical attenuator by controlling the amplitude of the driving voltage.

3. The optical transmitting apparatus according to claim 1, wherein
    the data correlates an amplitude of the driving voltage and a combination of the driving voltage and a modulation degree in superimposition of the information on the light by the variable optical attenuator, and
    the controller determines the bias of the driving voltage and identifies based on the data, an amplitude of the driving voltage corresponding to a combination of the determined bias of the driving voltage and a target value of a modulation degree in the superimposition of the information on the light by the variable optical attenuator, the controller controlling the bias of the driving voltage generated by the generator to become the determined bias of the driving voltage, and controlling the amplitude of the driving voltage generated by the generator to become the identified amplitude of the driving voltage.

4. The optical transmitting apparatus according to claim 1, wherein
the data correlates the driving voltage and an attenuation amount of the light by the variable optical attenuator, and
the controller identifies based on the data, the driving voltage corresponding to a target value of an average attenuation amount of the light by the variable optical attenuator and controls the bias of the driving voltage based on the identified driving voltage.

5. The optical transmitting apparatus according to claim 1, wherein
the controller calculates an average attenuation amount of the light by the variable optical attenuator based on a monitoring result of a level of the light attenuated by the variable optical attenuator and controls the bias of the driving voltage generated by the generator based on the calculated average attenuation amount.

6. The optical transmitting apparatus according to claim 5, wherein
the controller calculates the average attenuation amount of the light by the variable optical attenuator by averaging monitoring results.

7. The optical transmitting apparatus according to claim 6, wherein
the controller calculates the average attenuation amount of the light by the variable optical attenuator by subtracting from the monitoring result at a time point, a value based on the value of the information at a time point, the bias of the driving voltage and the amplitude of the driving voltage, and data indicating characteristics between the driving voltage and the attenuation amount of the light by the variable optical attenuator.

8. The optical transmitting apparatus according to claim 1, further comprising
a transmitter optical subassembly (TOSA) that includes the variable optical attenuator.

9. An optical level control method of an optical transmitting apparatus, wherein
the optical transmitting apparatus includes a magneto-optical effect-type variable optical attenuator disposed by spatial coupling between a light source and an optical fiber, and configured to attenuate light output from the light source and coupled to the optical fiber, according to an input driving voltage, the optical level control method comprising:
generating, by a generator, a driving voltage of the variable optical attenuator based on information to be superimposed on the light by the variable optical attenuator, the generator inputting the generated driving voltage into the variable optical attenuator, and
controlling, by a controller, a bias of the generated driving voltage, the controller controlling an amplitude of the generated driving voltage based on data according to characteristics between the driving voltage and an attenuation amount of the light by the variable optical attenuator.

10. An optical transmitting apparatus comprising:
a variable optical attenuator of a magneto-optical effect type disposed by spatial coupling between a light source and an optical fiber, the variable optical attenuator configured to attenuate light output from the light source and coupled to the optical fiber, according to an input driving voltage;
a generator configured to generate the driving voltage of the variable optical attenuator based on information to be superimposed on the light by the variable optical attenuator, the generator inputting the generated driving voltage into the variable optical attenuator; and
a controller configured to control an amplitude of the driving voltage generated by the generator, based on a monitoring result of a level of the light attenuated by the variable optical attenuator, after controlling a bias of the driving voltage generated by the generator.

11. The optical transmitting apparatus according to claim 10, wherein
the controller calculates a modulation degree in superimposition of the information on the light by the variable optical attenuator based on the monitoring result, and controls the amplitude of the driving voltage generated by the generator based on the calculated modulation degree.

12. The optical transmitting apparatus according to claim 10, wherein
the controller calculates an average attenuation amount of the light by the variable optical attenuator based on the monitoring result, and controls the bias of the driving voltage generated by the generator based on the calculated average attenuation amount.

13. The optical transmitting apparatus according to claim 12, wherein
the controller calculates the average attenuation amount of the light by the variable optical attenuator by averaging monitoring results.

14. The optical transmitting apparatus according to claim 12, wherein
the controller calculates the average attenuation amount of the light by the variable optical attenuator by subtracting from the monitoring result at a time point, a value based on a value of the information at the time point, the bias of the driving voltage and the amplitude of the driving voltage, and data indicating characteristics between the driving voltage and the attenuation amount of the light by the variable optical attenuator.

15. An optical level control method of an optical transmitting apparatus, wherein
the optical transmitting apparatus includes a magneto-optical effect-type variable optical attenuator disposed by spatial coupling between a light source and an optical fiber, and configured to attenuate light output from the light source and coupled to the optical fiber, according to an input driving voltage, the optical level control method comprising:
generating, by a generator, a driving voltage of the variable optical attenuator based on information to be superimposed on the light by the variable optical attenuator, the generator inputting the generated driving voltage into the variable optical attenuator, and
controlling, by a controller, an amplitude of the generated driving voltage based on a monitoring result of a level of the light attenuated by the variable optical attenuator, after controlling a bias of the generated driving voltage.

* * * * *